Dec. 18, 1945. W. J. STEVENSON 2,391,361
GOGGLE
Filed Sept. 11, 1943
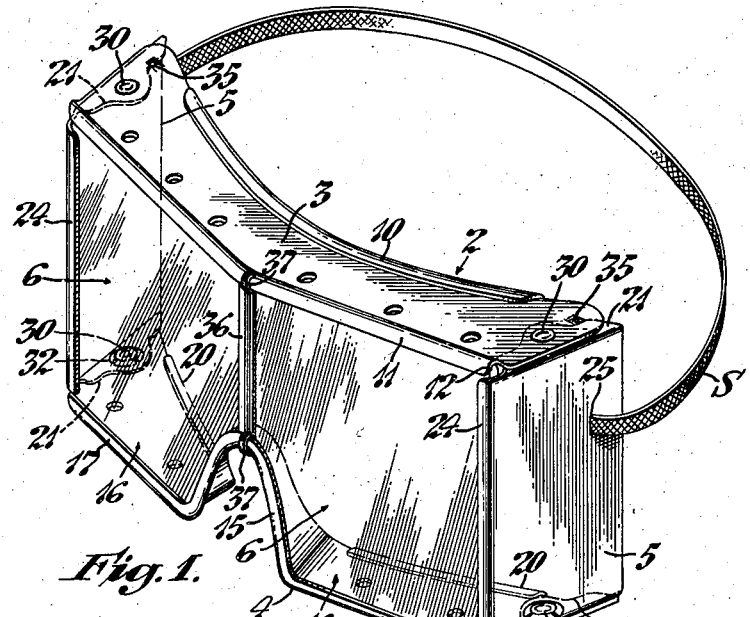
Fig. 1.
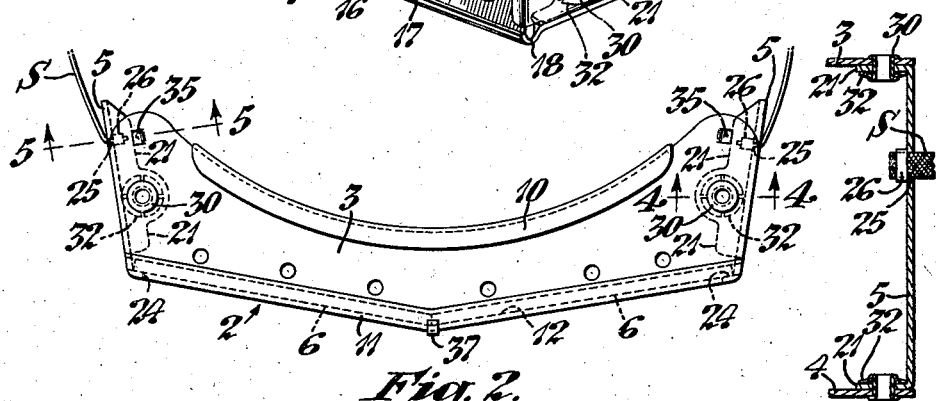
Fig. 2.
Fig. 4.
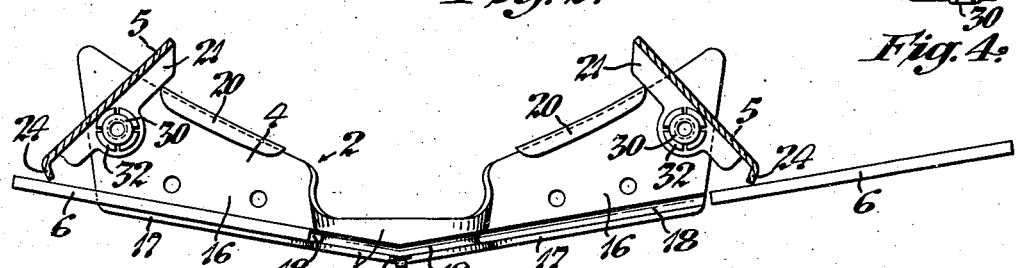
Fig. 3.
Fig. 5.
Inventor:
Walter J. Stevenson
By
Attorneys.

Patented Dec. 18, 1945

2,391,361

UNITED STATES PATENT OFFICE 2,391,361

GOGGLE

Walter J. Stevenson, Riverside, R. I., assignor to Watchemoket Optical Co., Inc., Providence, R. I., a corporation of Rhode Island Application September 11, 1943, Serial No. 501,975

2 Claims. (Cl. 2—14)

This invention relates to goggles for protecting the eyes of workers in industrial plants, for example, machinists, foundrymen, chippers, welders, stone-cutters and other artisans exposed to flying sparks, metal chips or particles thrown from grinding and polishing wheels.

A particular object of the present invention is to provide a goggle having a rigid frame with the lenses adapted to be conveniently applied thereto and removed therefrom without springing or spreading the frame.

Another object of the invention is to provide a goggle of the type indicated comprising a rigid box-like frame having top and bottom members formed with longitudinal grooves or guideways for receiving the lenses and means for closing the sides of the frame to retain the lenses in place.

Another object of the invention is to provide a goggle of the type indicated having a frame with side panels pivotally connected to its top and bottom members to adapt them to be swung into open position at the sides of the frame to permit the lenses to be slid thereinto and swung to closed position on the frame to retain the lenses in place.

Another object of the invention is to provide in a goggle of the type indicated detent-means for releasably locking the side panels of the frame in closed position to fixedly retain the lenses in place.

Another object of the invention is to provide a goggle of the type indicated which is of simple, durable construction with its parts adapted to be easily and conveniently assembled with a minimum of operations.

Further objects of the improvement are set forth in the following specification which describes a preferred embodiment of the invention, by way of example, as illustrated by the accompanying drawing. In the drawing:

Fig. 1 is a perspective view of a goggle embodying the present improvements;

Fig. 2 is a plan view of the goggle frame;

Fig. 3 is a plan view of the frame shown part-sectional in a median horizontal plane and indicating the manner in which the lenses are inserted in or removed from the frame;

Fig. 4 is a vertical sectional view of a portion of the frame taken on line 4—4 of Fig. 2 and showing the pivotal connections between the parts thereof; and Fig. 5 is a vertical sectional view taken on line 5—5 of Fig. 2 and showing the detent-means for releasably latching the pivoted side panels of the frame in closed relationship.

Referring to the drawing, the present goggle-frame 2 comprises four sections constructed from suitable plastic material, preferably transparent cellulose acetate, and arranged to mount a pair of replaceable lenses. The lenses may be of glass, but preferably they are constructed from methyl methacrylate or the material known in the trade as "Plexiglas" which is substantially non-fogging, non-distorting, resistant to scratching and not liable to shatter and splinter under the impact of particles of metal.

As herein illustrated, the frame 2 of the goggle is constructed in the form of a rectangular box to adapt it to be worn over prescription glasses without interference therewith. The frame 2 comprises a top member 3 and a bottom member 4 which are joined together at their ends by side panels 5. The top and bottom members 3 and 4 are adapted to support two separate lenses 6, 6 which are arranged for sliding movement therebetween in a manner explained hereinafter.

The top member 3 is of substantially bow-shape having its rearward edge curved to conform to the contour of the forehead of the wearer and its forward edge extending at opposite angles and meeting at the center, see Fig. 2. Preferably, the rearward edge of the top member 3 is enclosed by a narrow channeled strip 10 of plastic bent therearound and cemented thereto to provide a smooth rounded surface for contact with the forehead of the wearer. At the forward edge of the top member 3 the materal is bent upwardly and then curved downwardly in a narrow flange 11 forming a semi-circular groove or guide-way 12 for receiving the upper edges of the lenses 6.

The bottom member 4 is of substantially the same bowed shape as that of the top member except that its edges are interrupted at the center by an arched strip 15 forming a bridge or nose-piece connecting the two lateral wings 16. The arched strip or bridge 15 has its forward edge folded or bent around in circular contour to provide a smooth surface for contact with the nose of the wearer. At either side of the nose-piece 15 the wings 16 of the bottom member 4 are formed with flanges 17 bent downwardly and then curved upwardly to provide grooves or guideways 18 for receiving the lower edges of the two lenses 6, 6; it being noted also that the nose-piece 15 itself is provided along its sides with similar grooves 19. Cemented to the rearward curved edges of the wings 16 of the bottom member 4 are channeled strips 20, similar to the strip 10, to provide a smooth rounded surface for contact with the cheeks of the wearer.

The end or side panels 5 of the frame 2 consist of flat rectangular strips of the material having extensions or flanges 21 at the top and bottom bent inwardly at right-angles thereto to underlie the end of the top member 3 and overlie the end of the bottom member 4. At the forward ends of the side panels 5 angular flanges 24 are bent around from the material to adapt them to engage across the outer edges and overlie the front faces of the lenses 6, 6 to retain the latter in place in the guideways 12 and 18 of the top and bottom members 3 and 4. The side panels 5 are also provided with narrow slits 25 punched therethrough adjacent their rearward edges and adapted to receive the ends of an elastic band or strap S for encircling the head to hold the goggle against the face of the wearer. The elastic band S may have metal clips 26, see Fig. 4, clinched around its terminal portions to prevent the ends from being withdrawn through the slits 25.

The lenses 6 are of substantially rectangular outline except for cut-away portions at their inner, lower corners which form curved edges conforming to the arcuate shape of the nose-piece 15 on the frame 2. The upper and lower edges and the curved edge of each lens 6 are preferably tapered or beveled at the sides to adapt them to fit snugly within the grooves or guideways 12 of the top member 2 and the guideways 18 and 19 of the bottom member 4 and nose-piece 15, thus facilitating their insertion into the frame.

A particular object of the present invention is to provide a goggle of improved construction having a strong and sturdy frame while at the same time enabling the lenses to be inserted into or removed therefrom without springing or spreading its parts. In the present improved goggle the lenses 6 are adapted to be inserted through the open ends of the frame or removed therefrom with their upper and lower edges sliding in the guideways 12 and 18 of the top and bottom members 3 and 4. As previously explained, the side panels 5 operate to close the ends of the frame 2 and are adapted to be swung into open position for receiving the lenses 6, 6 in the guideways 12 and 18. In accordance with the present invention the side panels 5 are pivotally mounted on the top and bottom members 3 and 4 by means of hinge-pins in the form of hollow rivets 30. The rivets 30 pass through alined holes in the ends of the top and bottom members 3 and 4 and the flanges 21 on the panels 5 with their opposite ends headed over in the manner of an eyelet to hold the parts in assembled relationship, see Fig. 4. As shown in this latter view, a resilient washer 32 may be interposed between the inner head of each rivet 30 and the inner face of each flange 21 for applying an axial thrust which tends to frictionally engage the flanges against the inner faces of the top and bottom members 3 and 4. By this form of construction the four sections of the frame 2 are securely held in assembled relationship while permitting the side panels 5 to swing open with respect to the top and bottom members 3 and 4 to permit the insertion or dismounting of the lenses 6, 6.

The side panels 5 may be releasably locked in closed position with their angular flanges 24 overlying the outer ends of the lenses 6, 6 by means of suitable detents or latches. Figs. 2 and 5 illustrate the detent-means as comprising lugs or fingers 35 formed by slitting the material and bending the fingers downwardly from the top member 3 to adapt their ends to engage against the inner edges of the upper flanges 21 of the side panels 5. While the present drawing illustrates the detent-means as embodied in a preferred form of construction such means may take other forms within the scope and purview of the present invention.

In order to further provide for extreme rigidity and sturdiness of the goggle frame, I may attach a metal strut or stay 36 to its top and bottom members 3 and 4 extending therebetween. The stay 36 may consist of a strip of metal slightly bowed or crowned on its forward face to present a finished appearance and positioned with its sides overlying the seam between the two lenses 6, 6. The strut or stay 36 preferably has narrow flexible extensions or tabs 37 at its opposite ends which are inserted through a slit in the flange 11 on the top member 3 and a slit in the nose-piece 15 of the bottom member 4 and bent around in loops as shown in Fig. 1. The ends of the looped tabs 37 may be soldered or otherwise secured to the main portion of the strut 36 to provide a permanent, rigid joinder of the parts. By this form of construction the top and bottom members 3 and 4 are prevented from arching or spreading apart due to heat, loss of resilience or other causes and the lenses 6, 6 thus are more securely held in place. The strut or stay 36 may, if preferred, be constructed from a strip of plastic material and cemented or otherwise permanently joined to the top and bottom members 3 and 4.

With the parts of the goggle frame 2 assembled in the manner explained above the lenses 6, 6 may be inserted thereinto by first springing the edges of the flanges 21 of the end panels 5 across the ends of the detent lugs 35 and swinging the panels on their pivot-pins 30 to the position shown in Fig. 3. The angular flanges 24 thus will be withdrawn from across the edges of the lenses 6 to open the sides of the frame and permit the lenses to be slid into place in the frame 2. The outer ends of the channeled strips 10 and 20 on the top and bottom members 3 and 4 are adapted to serve as stops against which the inner edges of the flanges 21 of the side panels 5 engage to limit the swinging movement of the panels to open position. After the sides of the frame 2 have been opened in the manner explained above the lenses 6, 6 may be inserted thereinto by entering their upper and lower beveled edges in the guideways 12 and 18 of the top and bottom members 3 and 4, respectively, and sliding them into the frame. In Fig. 3 one lens 6 is represented as having been slid into place while the complementary lens is shown in position for sliding it in the guideways of the frame 2. When the lenses 6, 6 have been slid into place their inner edges will abut in a seam at the center of the frame 2 at the rear of the strut or stay 36 as shown in Figs. 1 and 2. With the lenses 6, 6 assembled in the frame 2 the side panels 5 are swung back into closed position with their flanges 24 engaging across the outer edges of the lenses. During this latter movement of the panels 5 their upper flanges 21 will ride over the detent-lugs 35 and finally snap into place across the ends thereof to latch or lock the panels in closed relationship. With the lenses 6, 6 thus retained in the frame 2 the complete goggle is ready for use and may be applied by placing it against the wearer's face with the elastic band S encircling the head.

When it is desired to remove the lenses 6 for any reason the side panels 5 may be swung to their open position shown in Fig. 3, after which the lenses may be withdrawn with their beveled edges sliding in the guideways 12 and 18.

It will be observed from the foregoing specification that the present invention provides a light-weight, completely transparent goggle adapted to afford maximum protection to the eyes of the wearer and wide range of vision. The improved goggle is of stronger and more rigid construction than goggles of similar types with its lenses more securely held in the frame while being readily removable therefrom. As a further feature of improvement, the present invention provides means for more conveniently inserting the lenses into the frame and dismounting them therefrom.

While the improved goggle is herein shown and described as embodying a preferred form of construction, it is to be understood that modifications may be made in the structure and arrangement of its parts without departing from the spirit or scope of the invention. Therefore, without limiting myself in this respect, I claim:

1. In a goggle of the type indicated, a substantially rigid frame comprising a longitudinally-extending top member having its rearward edge of arcuate contour to fit the face of the wearer, a bottom member of substantially the same form and having its lateral wing-portions connected by an arched bridge-portion of narrow width adapted to fit over the nose of the wearer, said top and bottom portions constructed of transparent plastic material with grooves at their forward edges for holding a pair of lenses extending in angular relation outwardly from the center of the frame, substantially rectangular side panels having hinge-portions underlying the top and bottom members of the frame and pivotally connected thereto to rigidly connect said top and bottom members, said side panels constructed of transparent plastic material and having inwardly-directed integral flanges at their forward edges adapted to extend vertically across the edges of the lenses to retain them in the frame, and said hinges so constructed and arranged as to adapt the flanges on the side panels to be swung back to release the lenses to permit them to be withdrawn from the frame for replacement.

2. In a goggle of the type indicated, a frame constructed entirely of transparent plastic material and comprising a top member shaped along its rearward edge to conform to the face of the wearer, a bottom member having substantially the same shape as the top member with an arched central portion connecting its side portions and adapted to fit the nose of the wearer, side panels of rectangular shape extending between the top and bottom members to maintain them rigidly in spaced relationship, said side panels having flanges at top and bottom bent inwardly therefrom to underlie the ends of the top and bottom members, eyelets extending through the top and bottom members and the flanges on the side panels for hingedly connecting the side panels to the frame, said top and bottom members having grooves at their forward edges for holding a pair of lenses and said side panels having flanges at their forward edges for overlapping the ends of the lenses to retain them in place in the grooves of the top and bottom members, and friction means for normally preventing the side panels from turning on their hinges while adapting them to be swung to release their forward flanges from the edges of the lenses to permit the latter to be withdrawn from the frame.

WALTER J. STEVENSON.